United States Patent [19]

Nelson et al.

[11] Patent Number: 5,113,511
[45] Date of Patent: May 12, 1992

[54] SYSTEM FOR DYNAMICALLY PROVIDING PREDICTED HIGH/SLOW SPEED ACCESSING MEMORY TO A PROCESSING UNIT BASED ON INSTRUCTIONS

[75] Inventors: Craig Nelson, Redwood City; Javier Solis, Santa Clara; David L. Needle, Alameda, all of Calif.

[73] Assignee: Atari Corporation, Sunnyvale, Calif.

[21] Appl. No.: 360,357

[22] Filed: Jun. 2, 1989

[51] Int. Cl.[5] ................... G06F 12/02; G06F 12/00
[52] U.S. Cl. ........................... 395/425; 364/DIG. 1;
364/232.9; 364/242.32; 364/244; 364/255.8;
364/948.1; 364/955.6; 364/958.5; 273/85 G;
365/230.1
[58] Field of Search ... 364/200 MS File, 900 MS File;
273/85 G; 365/233, 230.1

[56] References Cited

U.S. PATENT DOCUMENTS

| | | | |
|---|---|---|---|
| 4,249,744 | 2/1981 | Bromley | 273/859 |
| 4,276,609 | 6/1981 | Patel | 364/900 |
| 4,463,443 | 4/1984 | Frankel et al. | 364/900 |
| 4,485,457 | 11/1984 | Balaska et al. | 364/900 |
| 4,613,953 | 9/1986 | Bush et al. | 364/900 |
| 4,631,702 | 12/1986 | Korba | 364/900 |
| 4,727,491 | 2/1988 | Culley | 364/200 |
| 4,774,654 | 9/1988 | Pomerene et al. | 364/200 |
| 4,792,929 | 12/1988 | Olson et al. | 365/233 |
| 4,821,229 | 4/1989 | Jauregui | 364/200 |
| 4,823,324 | 4/1989 | Taylor et al. | 365/230 |
| 4,833,650 | 5/1989 | Hirayama et al. | 365/225.7 |
| 4,835,681 | 5/1989 | Culley | 364/200 |
| 4,847,758 | 7/1989 | Olson et al. | 364/200 |
| 4,862,348 | 8/1989 | Nakamura | 364/200 |
| 4,870,622 | 9/1989 | Aria et al. | 365/230.02 |

Primary Examiner—Thomas C. Lee
Assistant Examiner—Krisna Lim
Attorney, Agent, or Firm—Michael L. Sherrard

[57] ABSTRACT

A system (60) for predicting CPU addresses includes a CPU (34) connected by bus (62) to page mode address predicting circuit (64). The page mode address predicting circuit (64) is connected to memory arbitration circuits (66) by bus (68). The memory arbitration circuits (66) are connected to RAM (42) by address, data and control busses (44), (46) and (48). The CPU (34), page mode address predicting circuit (64) and the memory arbitration circuits 66 are contained in a microprocessor integrated circuit (32). The page mode predicting circuit 64 examines signals from the CPU (34) to be supplied to the data bus (46) at the time of a SYNC pulse. This operation results in examination of the first byte of a CPU instruction to determine how many of the following memory accesses will be able to be carried out in high speed mode. If it is determined that the next memory access will be able to be carried out in the high speed mode, then the next memory cycle is performed using a high speed access mode of the RAM (42), e.g. page mode access.

15 Claims, 4 Drawing Sheets

FIG.—1

MICROPROCESSOR OP CODE TABLE

| SD | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | BRK | ORA Ind,X | | | TSB* zpg | ORA zpg | ASL zpg | RMB0* zpg | PHP | ORA Imm | ASL A | | TSB* abs | ORA abs | ASL abs | BBR0* zpg |
| 1 | BPL rel | ORA Ind,Y | ORA (zpg) | | TRB* zpg | ORA zpg,X | ASL zpg,X | RMB1* zpg | CLC | ORA abs,Y | INA* A | | TRB* abs | ORA abs,X | ASL abs,X | BBR1* zpg |
| 2 | JSR abs | AND Ind,X | | | BIT* zpg | AND zpg | ROL zpg | RMB2* zpg | PHP | AND Imm | ROL A | | BIT abs | AND abs | ROL abs | BBR2* zpg |
| 3 | BMI rel | AND Ind,Y | AND (zpg) | | BIT* zpg,X | AND zpg,X | ROL zpg,X | RMB3* zpg | SEC | AND abs,Y | DEA* A | | BIT*† abs,X | AND abs,X | ROL abs,X | BBR3* zpg |
| 4 | RTI | EOR Ind,X | | | | EOR zpg | LSR zpg | RMB4* zpg | PHA | EOR Imm | LSR A | | JMP abs | EOR abs | LSR abs | BBR4* zpg |
| 5 | BVC rel | EOR Ind,Y | EOR (zpg) | | STZ* zpg | EOR zpg,X | LSR zpg,X | RMB5* zpg | CLI | EOR abs,X | PHY* | | | EOR abs,X | LSR abs,X | BBR5* zpg |
| 6 | RTS | ADC Ind,X | | | STZ* zpg | ADC zpg | ROR zpg | RMB6* zpg | PLA | ADC Imm | ROR A | | JMP (abs) | ADC abs | ROR abs | BBR6* zpg |
| 7 | BVS rel | ADC Ind,Y | ADC (zpg) | | STZ* zpg,X | ADC zpg,X | ROR zpg,X | RMB7* zpg | SEI | ADC abs,Y | PLY* | | JMP abs,(ind,X) | ADC abs,X | ROR abs,X | BBR7* zpg |
| 8 | BRA rel | STA Ind,X | | | STY zpg | STA zpg | STX zpg | SMB0* zpg | DEY | BIT Imm | TXA | | STY abs | STA abs | STX abs | BBS0* zpg |
| 9 | BCC rel | STA Ind,Y | STA (zpg) | | STY zpg,X | STA zpg,X | STX zpg,Y | SMB1* zpg | TYA | STA abs,Y | TXS | | STZ* abs | STA abs,X | STZ* abs,X | BBS1* zpg |
| A | LDY Imm | LDA Ind,X | LDX Imm | | LDY zpg | LDA zpg | LDX zpg | SMB2* zpg | TAY | LDA Imm | TAX | | LDY abs | LDA abs | LDX abs | BBS2* zpg |
| B | BCS rel | LDA Ind,Y | LDA (zpg) | | LDY zpg,X | LDA zpg,X | LDX zpg,Y | SMB3* zpg | CLV | LDA abs,Y | TSX | | LDY abs,X | LDA abs,X | LDX abs,X | BBS3* zpg |
| C | CPY Imm | CMP Ind,X | | | CPY zpg | CMP zpg | DEC zpg | SMB4* zpg | INY | CMP Imm | DEX | | CPY abs | CMP abs | DEC abs | BBS4* zpg |
| D | BNE rel | CMP Ind,Y | CMP (zpg) | | | CMP zpg,X | DEC zpg,X | SMB5* zpg | CLD | CMP abs,Y | PHX* | | | CMP abs,X | DEC abs,X | BBS5* zpg |
| E | CPX Imm | SBC Ind,X | | | CPX zpg | SBC zpg | INC zpg | SMB6* zpg | INX | SBC Imm | NOP | | CPX abs | SBC abs | INC abs | BBS6* zpg |
| F | BEQ rel | SBC Ind,Y | SBC (zpg) | | | SBC zpg,X | INC zpg,X | SMB7* zpg | SED | SBC abs,Y | PLX* | | | SBC abs,X | INC abs,X | BBS7* zpg |

FIG.-5

SYSTEM FOR DYNAMICALLY PROVIDING PREDICTED HIGH/SLOW SPEED ACCESSING MEMORY TO A PROCESSING UNIT BASED ON INSTRUCTIONS

BACKGROUND OF THE INVENTION

1. Field of the Invention

The present invention relates generally to a system and method that allows page mode addressing to be retrofit to existing microprocessors that were designed without page mode addressing. More particularly, it relates to such a system and method that will predict central processing unit (CPU) memory accesses to addresses that can be accessed in a high speed mode. Most especially, it relates to such a system and method which does not require the use of higher speed hardware than other parts of the CPU and memory system. The invention further relates to a graphics display system incorporating a system and method for predicting CPU addresses.

2. Description of the Prior Art

Most data processing CPUs access memory in a sequential fashion. A sequential memory access in which the address of memory used for the access is either immediately above or immediately below the address of memory used in the preceding access.

Memory systems typically operate in both normal modes and high speed modes. Common high speed modes are page mode access and nibble mode access for ordinary dynamic random access memory (DRAM) and serial port access for dual port (Video RAM) memory systems. Since the high speed modes are typically twice as fast as the normal access mode, significant system performance improvements can be obtained if the high speed modes can be used for most accesses.

State of the art microprocessors typically incorporate CPUs with a type of sequential operation detector built into them. The fetching of instructions may require more than one memory access per instruction. These accesses are almost always sequential in nature. Previous sequential operation detectors used comparators of the current address and the previous address to detect sequentiality, or in some cases, inclusion in the same memory page. Such implementations require high speed hardware, usually higher speed than any other part of the CPU-memory system and can only be used on a CPU that provides the next address early enough in a cycle to allow for a decision soon enough for any actual system performance improvement. However, earlier microprocessor designs do not incorporate this sequential operation detection capability. If a way could be provided to retrofit this capability to existing microprocessor designs, the result would be a significant performance improvement with such microprocessors, while allowing use of the massive volumes of software and trained designers that are available for popular existing microprocessor designs.

SUMMARY OF THE INVENTION

Accordingly, it is an object of this invention to provide a system and method for predicting CPU memory accesses able to be carried out in high speed mode that can be retrofit to existing microprocessor designs.

It is another object of the invention to provide such a system and method that does not require the use of hardware that is higher speed than other parts of a CPU-memory system.

It is a further object of the invention to provide a system and method that predicts whether the next memory access can be carried out in high speed mode in advance of knowledge by the CPU of the next address for a memory access.

It is still another object of the invention to provide a graphics display system that provides real time, perspective, color graphics with realistic motion incorporating such a system and method for predicting CPU accesses.

It is a still further object of the invention to provide such a graphics display system in the form of a hand held unit.

The attainment of these and related objects may be achieved through use of the novel system and method for predicting CPU addresses herein disclosed. A system for predicting CPU addresses in accordance with this invention has a processing unit and a random access memory connected to supply data and instructions to the processing unit. The random access memory is accessible by the processing unit in a high speed mode and in a lower speed mode. A means is connected between the processing unit and the random access memory for predicting if a subsequent memory access by the CPU is to an address that is able to be accessed in a high speed mode. Often such accesses are to a sequential address to an address of a current memory access, but they can also be to the same address, to a previous adjacent address, or to a non-sequential address on the same memory page. The processing unit is responsive to the means for predicting an address to carry out the subsequent memory access in the high speed mode if the address of the subsequent memory access is able to be carried out in high speed mode.

A method for predicting CPU memory addressing in accordance with the invention includes supplying data and instructions to a processing unit. A random access memory is accessed in a high speed mode and in a lower speed mode. A subsequent memory access is predicted if it is to an address that can be accessed in high speed mode. The subsequent memory access is carried out in the high speed mode if the address of the subsequent memory access is able to be carried out in that mode, for example, sequential to the address of the current memory access.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 5 is an operation code table useful for understanding operation of the invention.

DETAILED DESCRIPTION OF THE INVENTION

Figure 1:
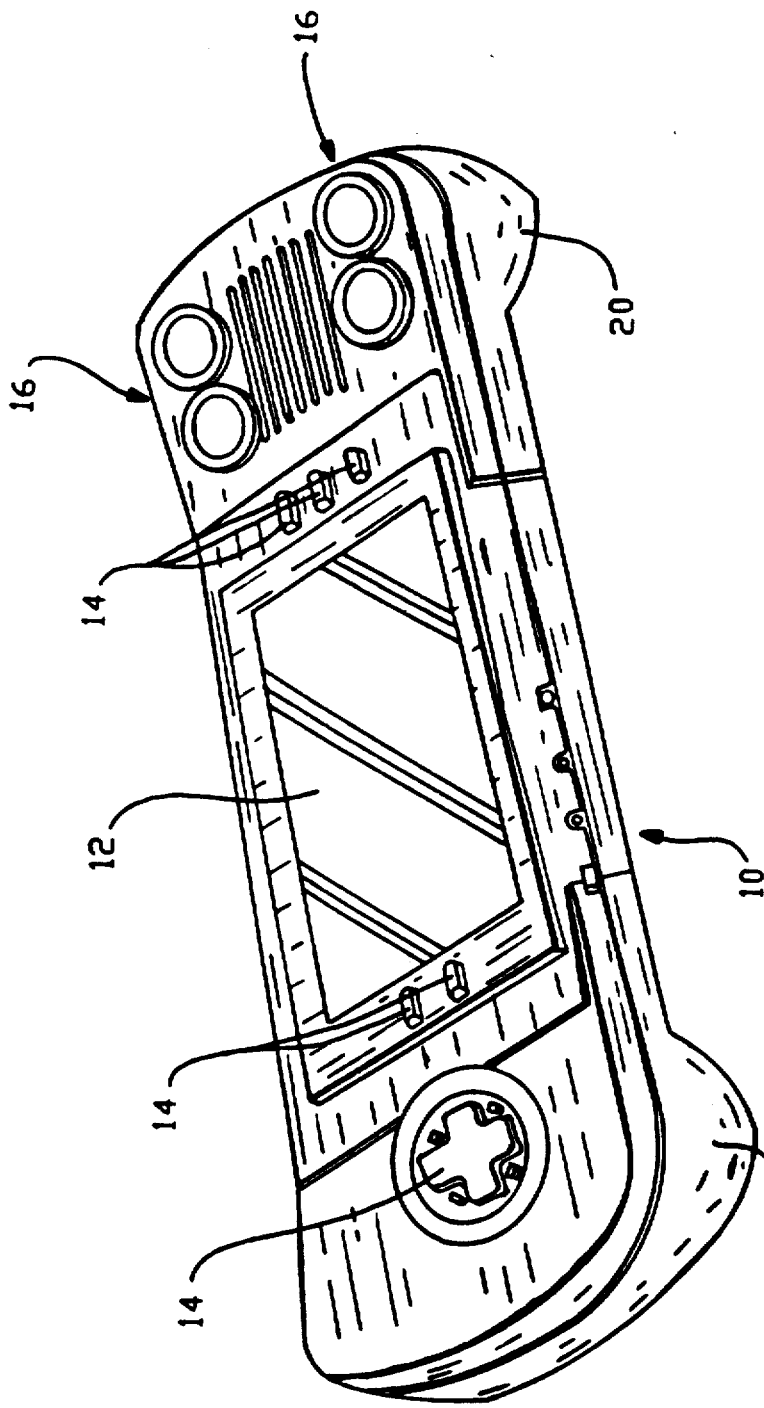
FIG. 1 is a perspective view of a system in which the present invention is useful.

Turning now to the drawings, more particularly to FIG. 1, there is shown a hand held electronic game system 10 which utilizes the present invention to provide a sufficient enhancement of microprocessor operation so that a conventional 6502 type microprocessor can be used to provide real time apparent three-dimensional, i.e., apparent perspective, graphics for a color liquid crystal display 12 used in the system 10. The system 10 includes conventional controls 14 and redundant sets 16 of buttons for firing weapons and similar functions. In use, the game system is grasped by handles 18 and 20 in the left and right hands, respectively, in the orientation shown. The redundant sets 16 of buttons allow the system 10 to be inverted for left hand operation of the buttons. When this is done, the orientation of the images on the display is flipped, so that it appears right side up when the sets 16 of buttons are on the left side of the system 10.

Those skilled in the art of graphics processing will appreciate the demanding processing requirements for presenting real time, apparent perspective, color graphics with realistic motion on the display 12. In fact, most personal computers are unable to present such realistic, perspective graphics with rapid enough motion to make games interesting. Usually, only arcade games presently have such capability. This is why the displays for most personal computer based video games are crude and are only two-dimensional, i.e., they lack perspective. Conventional hand held electronic games have even cruder, monochrome graphics. The system 10 is even more remarkable in that the real time, apparent perspective, color graphics with realistic motion are achieved by using a conventional 6502 type microprocessor, an early microprocessor design that has been available since the late 1970s. The system and method for predicting CPU addresses of this invention is one of the techniques used in the system 10 to enhance the performance of the 6502 microprocessor so that it is able to handle the graphics processing for the system 10.

Figure 2:
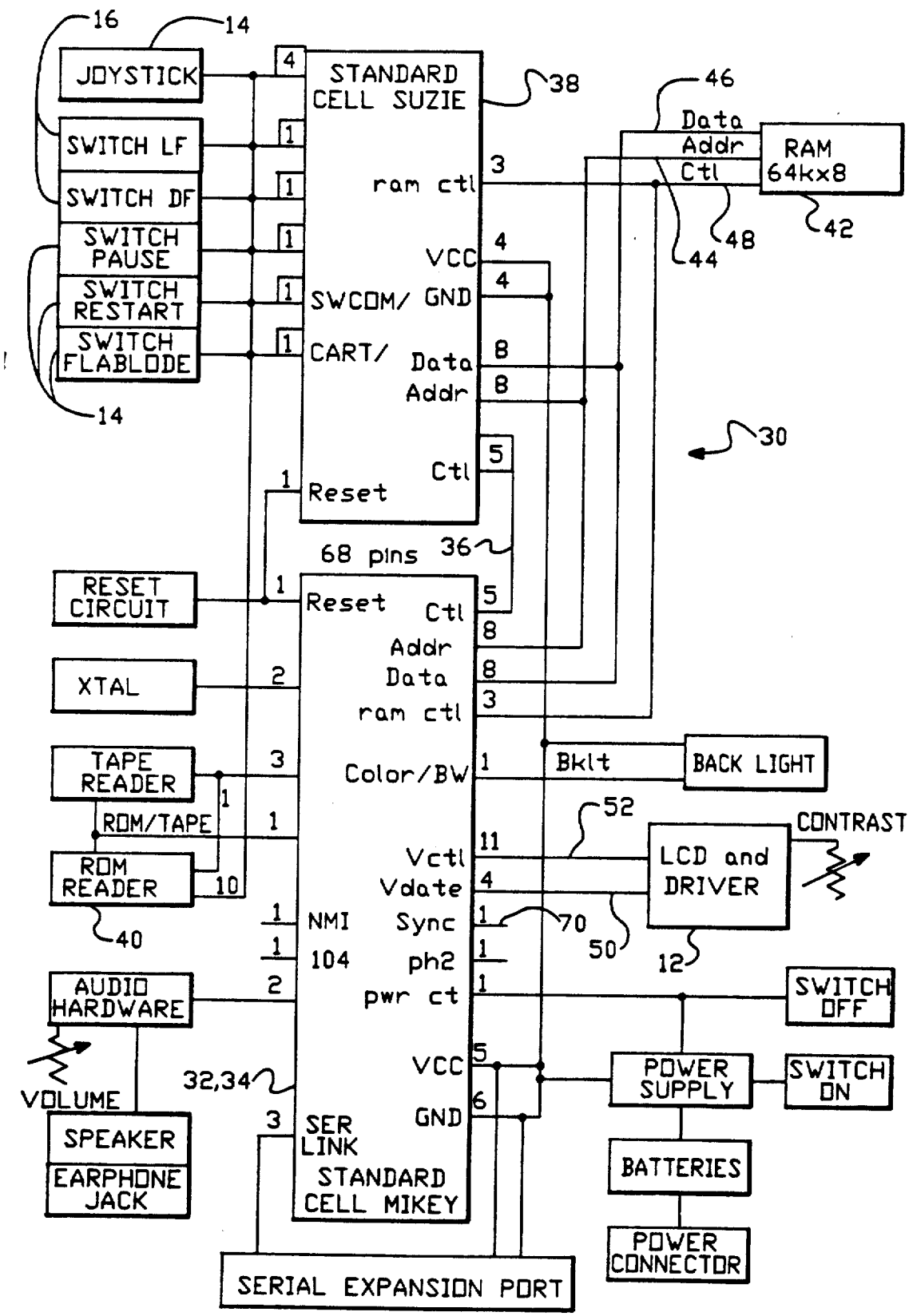
FIG. 2 is a block diagram of the system shown in FIG. 1.

FIG. 2 is a block diagram of electronics 30 for the system 10. A custom microprocessor integrated circuit 32 includes a standard 65C02 microprocessor CPU cell 34 and on chip interface and support circuits. The integrated circuit 32 is connected by a control bus 36 to a custom sprite engine integrated circuit 38, which also includes switch reader circuits for the switches 14 and 16 and read only memory (ROM) reader circuits for the ROM reader 40, included in the sprite engine integrated circuit 38 due to pin limitations on the microprocessor integrated circuit 32.

The integrated circuit 32 is connected to a 64K × 8 random access memory (RAM) 42 by 8-bit address and data busses 44 and 46 and by a 3-bit RAM control bus 48. The RAM 42 houses the video buffer(s) and collision buffer in addition to the game software. The RAM 42 has a 120 nanosecond row address strobe (RAS) access time and 60 nanosecond page mode column address strobe (CAS) access time. This allows a 250 ns (4 MegaHertz) page mode memory access rate and a 312 ns (3.2 MHz) normal memory access rate. Thus, the ability to use page mode memory accesses provided by the present invention substantially increases the speed of memory accesses. With a higher speed processor, more impressive memory access speed increases may be achieved.

The microprocessor integrated circuit 32 is connected to the liquid crystal display (LCD) 12 by a 4-bit video data bus 50 and an 11-bit video control bus 52. The LCD has a resolution of 160 horizontal color pixels by 102 vertical color pixels. The column drivers for the display 12 can generate 16 levels of intensity for each pixel, resulting in a palette of 4,096 colors. For purposes of this application, the remaining elements shown in FIG. 2 are conventional in nature, and they therefore will not be described further.

Figure 3:
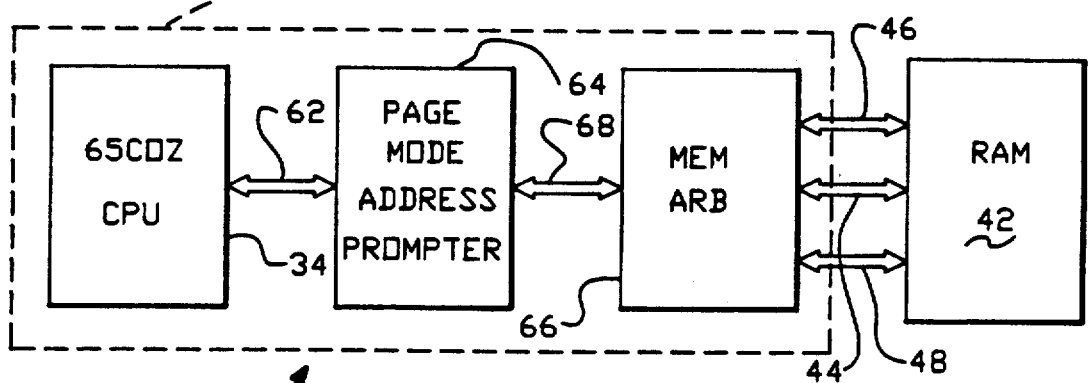
FIG. 3 is a block diagram of a system for predicting CPU addresses in accordance with the invention.

FIG. 3 shows a system 60 for predicting CPU address which is contained in the electronics 30 of FIG. 2. The CPU 34 is connected by bus 62 to page mode address predicting circuit 64. The page mode address predicting circuit 64 is connected to memory arbitration circuits 66 by bus 68. The memory arbitration circuits 66 are connected to RAM 42 by address, data and control busses 44, 46 and 48. The CPU 34, page mode address predicting circuit 64 and the memory arbitration circuits 66 are contained in the microprocessor integrated circuit 32. For the 65C02 CPU 34, the page mode predicting circuit 64 examines signals from the data bus 46 which are supplied to the CPU 34 att he time of a SYNC pulse for line 70 (FIG. 2). For other microprocessors, similar signals would be examined. For example, in the case of an 8080 type microprocessor, signals on three status liens and the data bus are examined. This operation results in examination of the first byte of a CPU instruction to determine how many of the following memory accesses will be able to be accessed in high speed mode. Two predictions are made: high speed access within this instruction, and high speed access through the first access of the next instruction. Either or both may be implemented. If it is predicted that the next memory access will be able to be in the high speed mode, then the next memory cycle is performed using one of the high speed access modes of the RAM 42, i.e., page mode access or nibble mode access. Since the high speed modes are substantially faster than the normal access mode, and since sequential operation can typically be used for 75 percent of the CPU cycles, significant system performance improvements can be realized.

Figure 4:
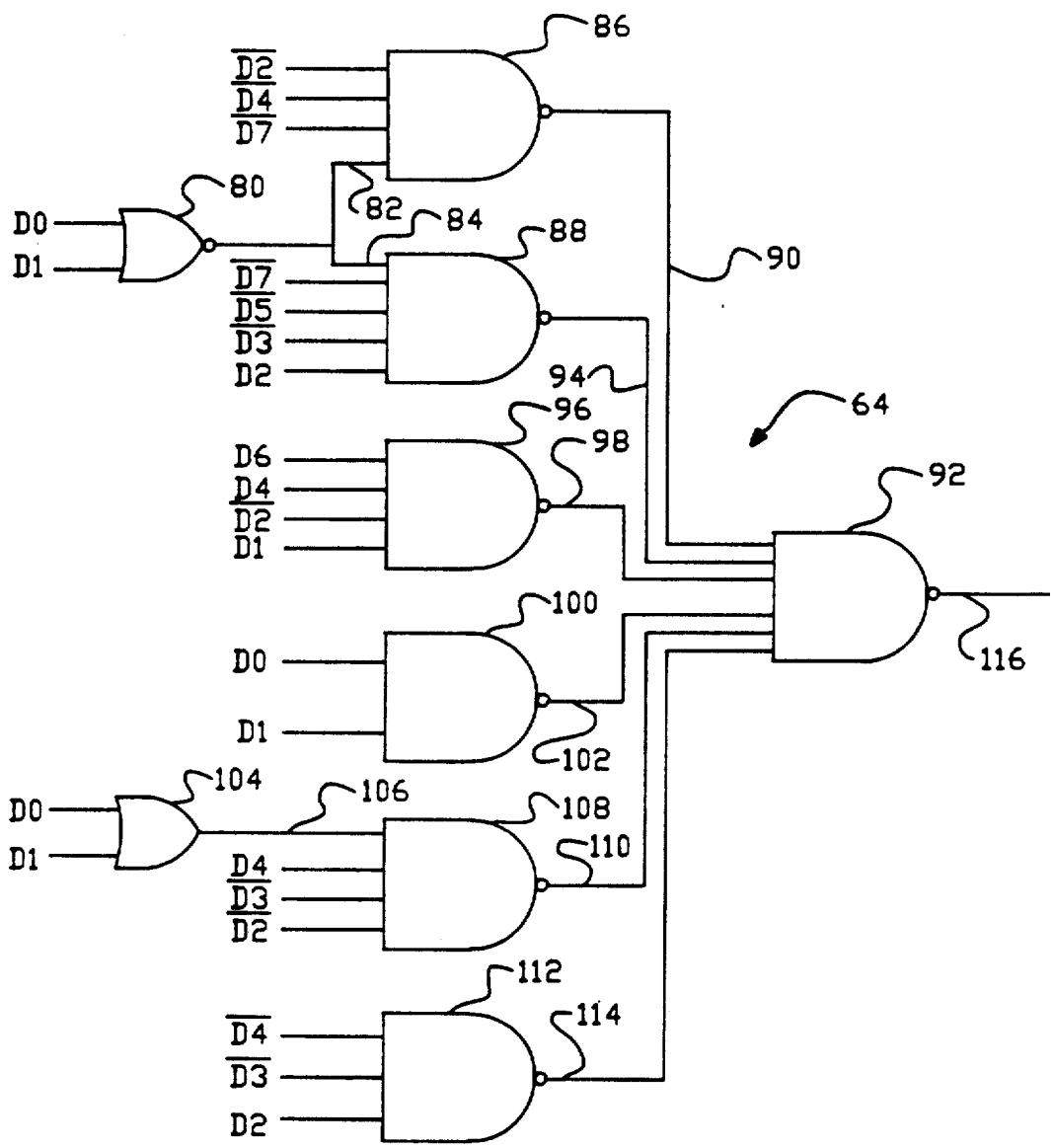
FIG. 4 is a circuit schematic of a portion of the system of FIG. 3.

FIG. 4 shows details of the page mode predicting circuit 64. A NOR gate 80 receives data line D0 and D1 inputs and supplies its output on lines 82 and 84 to NAND gates 86 and 88. The other inputs to NAND gate 86 are the D2, D4 and D7 data lines. The output of NAND gate 86 is supplied on line 90 to NAND gate 92. The other inputs to NAND gate 88 are the D7, D5, D3, and D2 data lines. The output of NAND gate 88 is supplied on line 94 as an input to NAND gate 92. Data lines D6, D4, D2, and D1 supply inputs to NAND gate 96. The output of NAND gate 96 is supplied to NAND gate 92 on line 98. Data lines D0 and D1 supply inputs to NAND gate 100. The output of NAND gate 100 is supplied to NAND gate 92 on line 102. The data lines D0 and D1 also supply inputs to OR gate 104, the output of which is supplied on line 106 as one input to NAND gate 108. The other inputs to NAND gate 108 are supplied by the D4, D3 and D2 data lines. The output of NAND gate 108 is supplied to NAND gate 92 on line 110. Data lines D4, D3 and D2 supply inputs to NAND gate 112, the output of which is supplied on line 114 to NAND gate 92. The output of NAND gate 92 on line 116 establishes whether the next two or three memory accesses will be able to be carried out in high speed mode. A high output on line 116 means that the next memory access is able to be carried out in high speed mode, and a low output on line 116 means that the next two memory accesses are able to be carried out in high speed mode. The circuit 64 gives one output line that predicts whether the following one or two cycles can be page mode. By reading the data lines when the status line (providing the SYNC pulse) is high, the circuit obtains the needed inputs to make the prediction.

In the 6502 microprocessor, the second step of each instruction is to increment the program counter (PC) by 1, which means that the next access for each new instruction is always sequential. Many of the instructions also have a second high speed access. FIG. 5 is a table showing hexadecimal codes for each instruction. All instructions except those enclosed in dotted lines have a second sequential access. The page mode address predictor 64 examines the hex codes for each instruction (in binary coded form) on the data bus and produces its output to indicate the category of each instruction, thus predicting high speed accesses for the next or the next two cycles.

Depending on the relative performance speed of the microprocessor used and memory access times, the predictions can either be used to actually fetch the data from the sequential addresses in advance of the cycle in which it is required, or to tell the microprocessor to use a high speed access mode from thee RAM, such as page mode. In the case of the 6502 microprocessor and the memory access times given above, the latter approach is sufficient to gain the above performance advantage. Given a higher microprocessor performance relative to memory access time, advance fetching would be appropriate.

There are three exceptions to the above operation that must be handled. If sequential addresses have a page boundary between them, a page fault will be generated when a page mode access is attempted. In that case, the microprocessor 34 ignores the output of the page mode address predictor 64 and carries out a normal memory access. Similarly, normal memory accesses are carried out in the case of an interrupt request (IRQ) instruction or a non-maskable interrupt (NMI) instruction. The latter instruction only occurs during debugging.

It should now be readily apparent to those skilled in the art that a novel system and method for predicting CPU addresses capable of achieving the stated objects of the invention has been provided. The system and method predicts high speed mode CPU memory accesses and can be retrofit to existing microprocessor designs. The system and method does not require the use of hardware that is higher speed than other parts of a CPU-memory system. The system and method predicts the high speed mode access capability of the next memory access in advance of knowledge by the CPU of the next address for a memory access. The system and method can be used to give a graphics display system that provides real time, pseudoperspective, color graphics with realistic motion. The graphics display system can be provided in the form of a hand held unit.

It should further be apparent to those skilled in the art that various changes in form and details of the invention as shown and described may be made. It is intended that such changes be included within the spirit and scope of the claims appended hereto.

What is claimed is:

1. A system for predicting processing unit memory addressing and for selectively providing high speed addressing of a random access memory, the system comprising;
    a processing unit;
    a random access memory connected to supply data and instructions to said processing unit in response to memory accesses from the processing unit, said random access memory being operable in a high speed mode for predetermined sequences of addresses and otherwise operable in a low speed mode; predicting means coupled to said random access memory for receiving instructions supplied by said random access memory to said processing unit and for providing a first signal in response to received instructions if the next memory access by said processing unit is to an address accessible in the high speed mode; and
    means for accessing said random access memory in the high speed mode in response to the first signal, and in the low speed mode otherwise.

2. The system of claim 1 in which the high speed mode is page mode accessing.

3. The system of claim 1 in which said predicting means is coupled to receive a status signal from said processing unit, said predicting means receiving an instruction in response to the status signal.

4. The system of claim 3 in which the status signal is a signal synchronized with the first byte of an instruction.

5. A method for dynamically providing selective high speed memory addressing in a system having a processing unit and a random access memory connected to supply instructions to the processing unit, the random access memory being operable in a high speed mode for predetermined sequences of addresses and otherwise operable in a low speed mode, the method comprising the steps of:
    providing instructions from the random access memory to the processing unit;
    predicting from the provided instructions if a subsequent memory access is to an address accessible in the high speed mode; and
    addressing said random access memory in the high speed mode in response to a prediction and in the low speed mode otherwise.

6. A method for dynamically providing selective high speed memory addressing as in claim 5 wherein the step of predicting is responsive to the first byte of each instruction.

7. A method for dynamically providing selective high speed memory addressing as in claim 5 wherein the step of predicting predicts in response to the provided instructions that multiple subsequent memory accesses are accessible in the high speed mode and the step of addressing is repeated multiple times in response.

8. A method for dynamically providing selective high speed memory addressing as in claim 5 wherein the step of addressing is accomplished by the processing unit.

9. A method for dynamically providing selective high speed memory addressing as in claim 5 wherein the step of addressing accesses said random access memory before an access to the same address by the processing unit.

10. A system for dynamically providing selective high speed memory addressing, the system comprising;
    a processing unit;
    a random access memory connected to supply instructions to said processing unit in response to memory accesses from said processing unit, said random access memory being operable in a high speed mode for predetermined sequences of addresses and otherwise operable in a low speed mode;

predicting means coupled to receive instructions supplied to said processing unit for providing a first signal in response to received instructions if the next memory access is to an address that accessible in the high speed mode; and mode selection means for accessing said random access memory in the high speed mode in response to the first signal and in the low speed mode otherwise.

11. A system for dynamically providing selective high speed memory addressing as in claim 10 wherein the predicting means is coupled to receive only the first byte of each instruction.

12. A system for dynamically providing selective high speed memory addressing as in claim 10 wherein the predicting means further provides a second signal in response to received instructions if multiple subsequent memory accesses are accessible in the high speed mode and the mode selection means accesses said random access memory in the high speed mode multiple times in response to the second signal.

13. A system for dynamically providing selective high speed memory addressing as in claim 10 wherein the mode selection means causes the processing unit to access said random access memory in the high speed mode in response to the first signal.

14. A system for dynamically providing selective high speed memory addressing as in claim 10 wherein the mode selection means causes a high speed memory access in response to the first signal before an access to the same address by the processing unit.

15. A system as in claim 10 wherein said predicting means logically includes a table of the processing unit instructions and a number of sequential memory accesses accessible in a high speed mode for each instruction.

* * * * *